United States Patent
Simske et al.

(10) Patent No.: US 8,672,226 B2
(45) Date of Patent: Mar. 18, 2014

(54) DECODING A PHYSICAL IMAGE

(75) Inventors: Steven J Simske, Fort Collins, CO (US); Guy Adams, Stroud (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 209 days.

(21) Appl. No.: 13/258,836

(22) PCT Filed: Jun. 11, 2009

(86) PCT No.: PCT/US2009/047055
§ 371 (c)(1),
(2), (4) Date: Sep. 22, 2011

(87) PCT Pub. No.: WO2010/144087
PCT Pub. Date: Dec. 16, 2010

(65) Prior Publication Data
US 2012/0012657 A1    Jan. 19, 2012

(51) Int. Cl.
*G02B 26/10* (2006.01)
*G06K 19/06* (2006.01)
*G06K 7/10* (2006.01)
*G06K 9/36* (2006.01)
*G06K 9/80* (2006.01)

(52) U.S. Cl.
USPC .................................. 235/462.25; 235/462.1

(58) Field of Classification Search
USPC ......................................... 235/462.1, 462.25
See application file for complete search history.

(56) References Cited

U.S. PATENT DOCUMENTS

| | | | |
|---|---|---|---|
| 5,124,536 A | 6/1992 | Priddy et al. | |
| 5,153,928 A | 10/1992 | Iizuka | |
| 5,339,164 A | 8/1994 | Lim | |
| 6,373,047 B1 | 4/2002 | Adan et al. | |
| 7,466,234 B2 | 12/2008 | Simske | |
| 8,194,973 B2 * | 6/2012 | Dixon et al. | 382/162 |
| 8,284,987 B2 * | 10/2012 | Ulichney et al. | 382/100 |
| 2004/0026511 A1 | 2/2004 | Cheung et al. | |
| 2004/0153649 A1 * | 8/2004 | Rhoads et al. | 713/176 |
| 2006/0045270 A1 * | 3/2006 | Cohen | 380/268 |

FOREIGN PATENT DOCUMENTS

KR    20080106165 A    12/2008

* cited by examiner

*Primary Examiner* — Michael G Lee
*Assistant Examiner* — Suezu Ellis
(74) *Attorney, Agent, or Firm* — Jack H. McKinney (57) ABSTRACT

A method for decoding information from a physical image having a plurality of payload patches includes generating a digital representation of the physical image. A plurality of regions are mapped to the plurality of payload patches in the digital representation. A scramble pattern is identified and the plurality of mapped regions of the digital representation are reordered according to the identified scramble pattern. Information is decoded from the payload patches of the reordered plurality of mapped regions.

12 Claims, 11 Drawing Sheets

DECODING A PHYSICAL IMAGE

BACKGROUND

Useful information can be encoded in printed images referred to generically as barcodes. Such a bar code can include a two dimensional data matrix made up of a grid of black and white patches. Other barcodes, such as a color mosaic, are three dimensional. A three-dimensional data matrix can be made up from a grid of patches with each patch having a color (the third dimension) selected from a predetermined palette. Information identifying a product can be encoded in such barcodes printed on packaging of a consumer good. The bar code can be scanned at a location such as a warehouse, point of sale, or repair facility to identify the product and other relevant information. In various applications, it may be desirable to scramble the patches in a barcode such as a data matrix to protect or conceal the information encoded.

DETAILED DESCRIPTION

Introduction

For security reasons, the patches in a barcode such as a data matrix may be scrambled to protect or otherwise conceal encoded information. Various embodiments described below operate to decode information from a physical image such as a data matrix with scrambled patches. In a particular example, a digital representation of a physical image of a barcode is generated. The barcode includes a plurality of scrambled payload patches. A plurality of regions is mapped to the payload patches of the digital representation. The regions of mapped payload patches are reordered according to a defined scramble pattern. Information can then be decoded from the payload patches of the reordered plurality of mapped regions.

Other embodiments operate to scramble the patches in a data matrix. In a particular example, information is encoded in a digital representation of a data matrix barcode having a plurality of payload patches. A plurality of regions is mapped to the payload patches in the digital representation. The mapped regions of payload patches are then reordered within the digital representation according to a defined scramble pattern. A physical image of the digital representation is produced.

Data Matrix Barcodes

Figure 1:
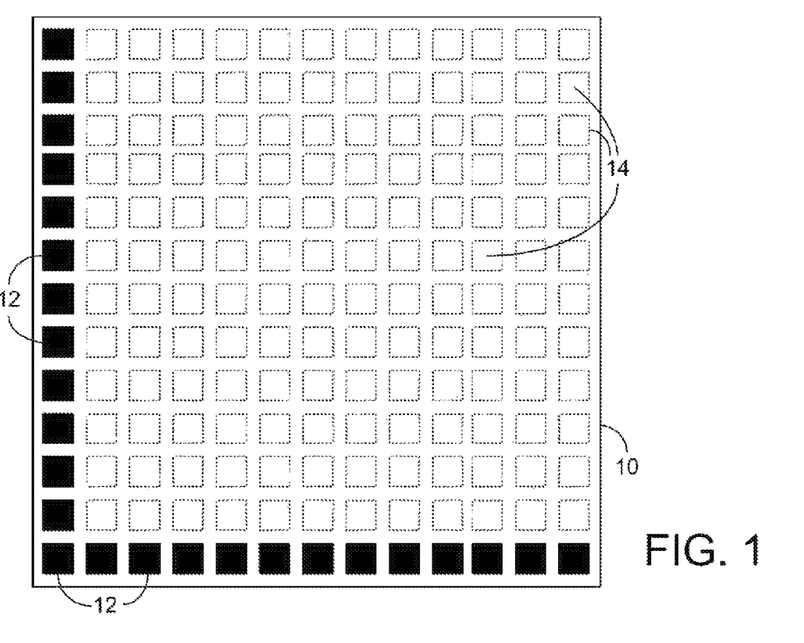
FIGS. 1 and 2 are exemplary images of data matrix barcodes having configuration patches and payload patches.
Figure 2:
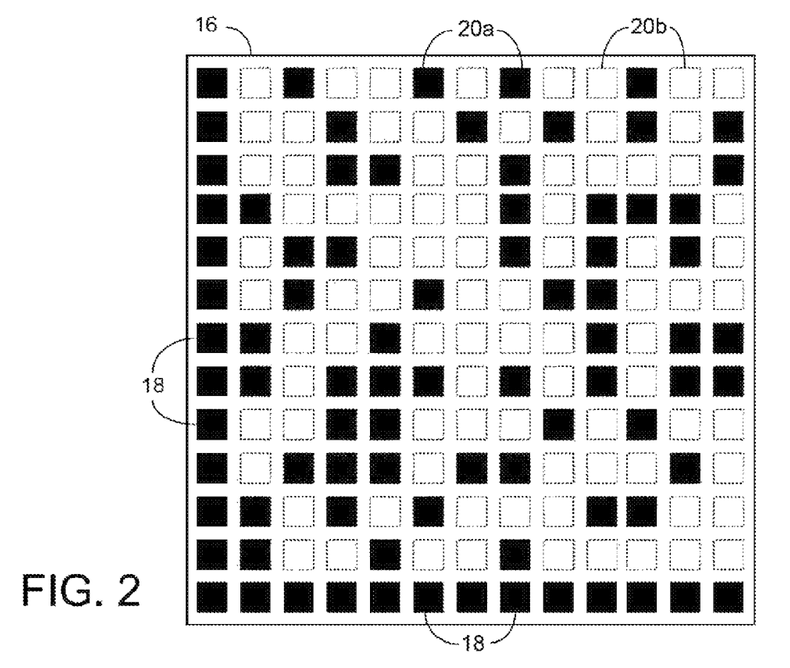

FIGS. 1 and 2 illustrate exemplary data matrix barcodes having configuration patches and payload patches according to embodiments. To distinguishing between the two types of patches 12 and 14 in FIG. 1, barcode 10 includes configuration patches 12 shown as solid squares and payload patches 14 shown in broken lines. Payload patches 14 are used to encode information. However, in the example of FIG. 1, payload patches 14 are "blank" and thus do not encode either a series of ones or zeros as the case may be. Calibration patches 12 are identified to properly orient and scale barcode 10 so that payload patches 14 are identified and read in the correct order. Where barcode 10 is a color data matrix, configuration patches 12 may also be used for color calibration.

Moving to the example of FIG. 2, data matrix barcode 16 includes configuration patches 18 and payload patches 20. Payload patches 20 are divided into solid patches 20a and blank or white patches 20b. Black and white payload patches 20a and 20b each represent a bit, that is, a zero or a one. When read in a designed order, the resulting bit string can, for example, represent information such as text, a number, or a look-up code, or any combination thereof. Where payload patches are of a palette of colors, each payload patch can represent two or more bits. For example with a palette of eight colors, each payload patch may represent three bits.

Region Mapping

Figure 3:
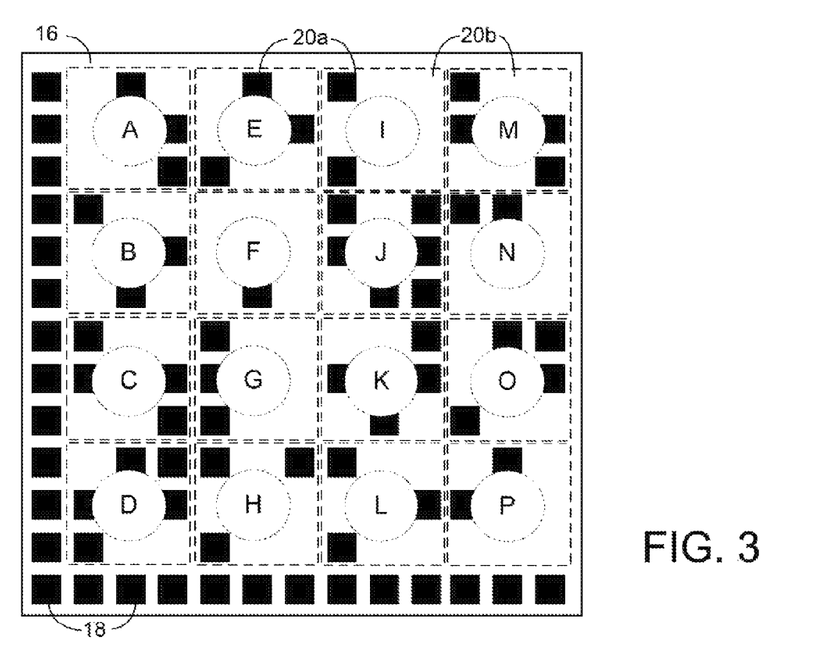
FIG. 3 is an exemplary image of a barcode in which regions are mapped to the payload patches according to an embodiment.
Figure 4:
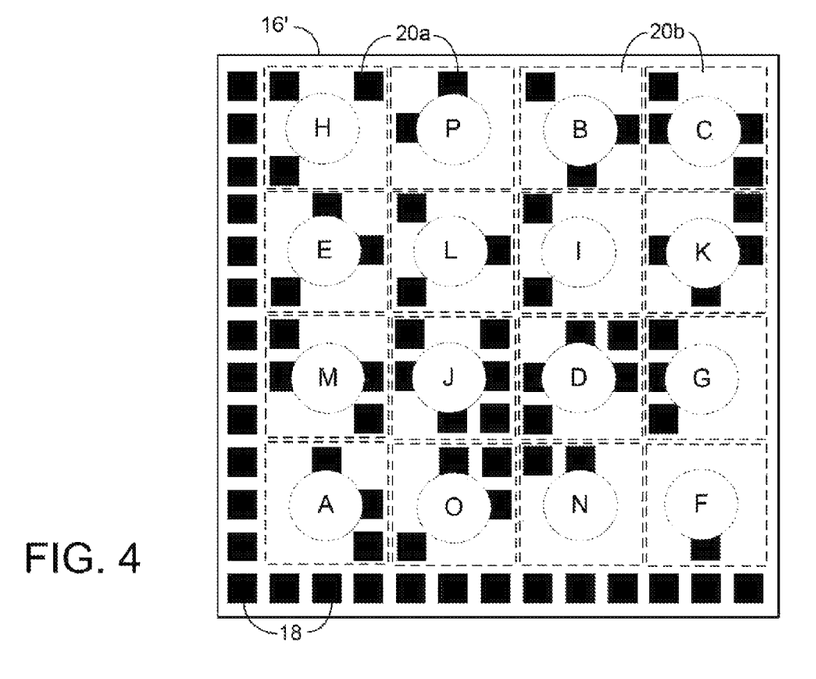
FIG. 4 is an exemplary image of a barcode in which the plurality of mapped regions of payload patches has been scrambled according to an embodiment.

To scramble a data matrix, a plurality of regions is mapped to the payload patches such as is depicted in the example of FIG. 3. The mapped regions are then reordered or scrambled as depicted in the example of FIG. 4. Starting with FIG. 3, barcode 16 is shown with regions A-P mapped to payload patches 20a and 20b. The term region as used refers to a boundary with a particular shape, size, and orientation. In the examples of FIGS. 3 and 4, each region is depicted as a square of a size that bounds nine payload patches 20a and 20b. Regions, however, can be one of any number of shapes, sizes, and orientations as is discussed below with respect to FIGS. 8 and 9. The phrase "mapped region" encompasses the payload patches mapped to a particular region. Thus in FIG. 3, mapped regions A-P of payload patches 20a and 20b are organized sequentially in a pattern that runs from top to bottom and then left to right such that pay load patches 20a and 20b can be read to decode information. Of course other patterns are possible.

In FIG. 4, mapped regions A-P in barcode 16' have been reordered according to a scramble pattern. The phrase scramble pattern as used herein refers to a reordering sequence of mapped regions of payload patches. In the Example of FIG. 4, the scramble pattern is identified as HEMAPLJOBIDNCKGF. When decoding information from a barcode, the payload patches are read or examined in a predetermined order. Thus, the information encoded by payload patches 20a and 20b has been obscured in barcode 16'.

Figure 5:
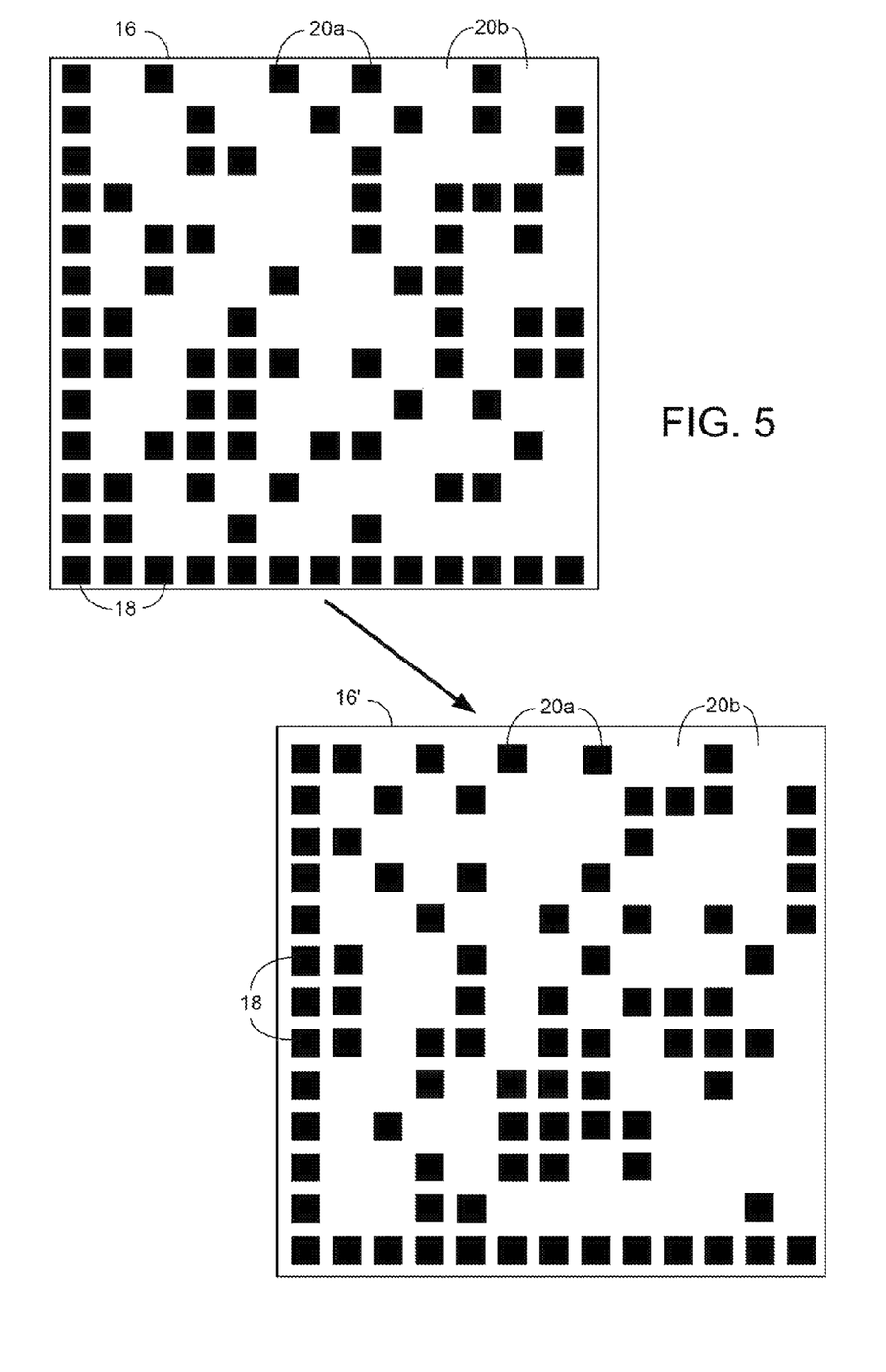
FIG. 5 depicts a barcode and a scrambled version of that barcode according to an embodiment.

FIG. 5 helps illustrate the visual differences between barcode 16 and barcode 16' with reordered mapped regions.

Figure 6:
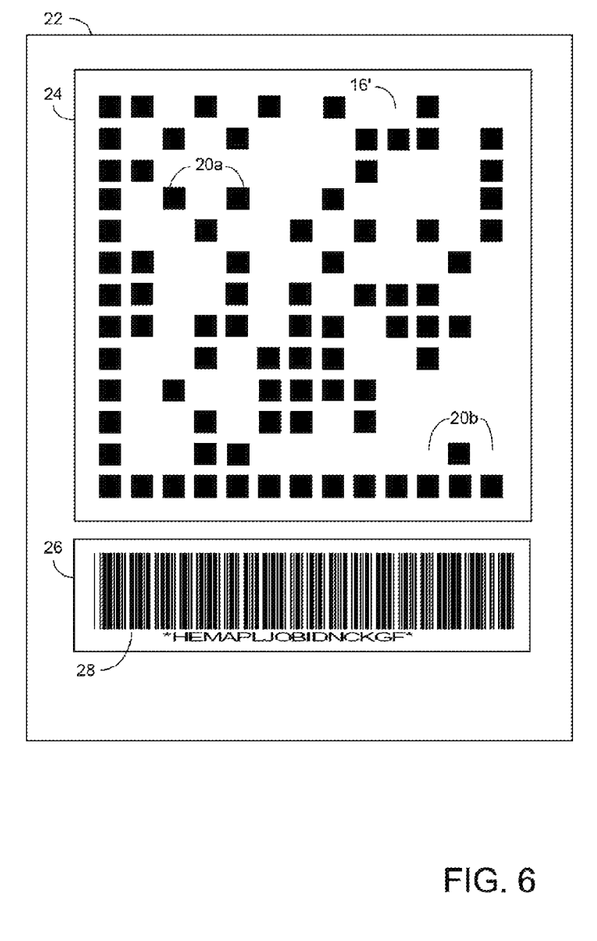
FIG. 6 depicts an object on which a first barcode and a second barcode encoding pattern data for the first barcode according to an embodiment.

FIG. 6 depicts an object 12 on which labels 24 and 26 have been adhered. Barcode 16' is formed on label 24 while barcode 28 has been formed on label 26. As discussed above, the mapped regions A-P of payload patches 20a and 20b have been reordered. Barcode 28 encodes data identifying the scramble pattern used to reorder the mapped regions. In the example of FIG. 6, barcode 28 encodes the scramble pattern HEMAPLJOBIDNCKGF. In other examples, barcode 28 may encode information used to look up the scramble pattern or any other information that could be used to identify a manner for unscrambling or otherwise reordering payload patches 20a and 20b.

Figure 7:
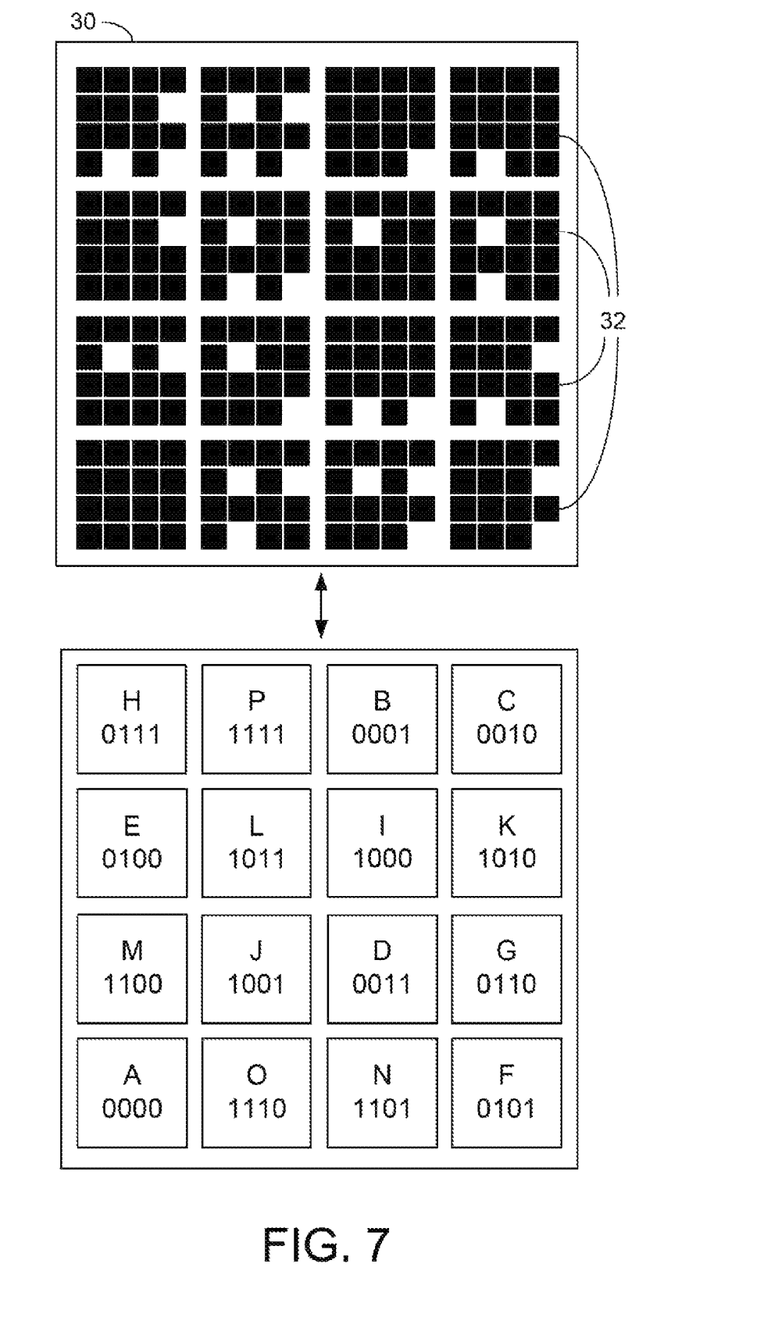
FIG. 7 depicts a patch of a barcode that is used to encode pattern data according to an embodiment.

While shown as encoded in as a sequence of black and white bars in barcode 28, the scramble pattern may be encoded in a variety of manners such as a second data matrix. The scramble pattern may even be encoded within a patch of a data matrix type barcode. For example, the scramble pattern may be encoded within a configuration patch 18 of barcode 16' shown in FIGS. 4-6. FIG. 7 depicts an implementation if which single patch 30 is used to encode the scramble pattern—HEMAPLJOBIDNCKGF. Patch 30 is divided into sub-patches 32. Each sub-patch 32 encodes a different portion of the scramble pattern. In particular, the sixteen characters A-P can be represented by four bits—0000 through 1111. Thus, in the example of FIG. 7, patch 30 includes sixteen sub-patches each encoding a different character of the scramble pattern by dropping zero to twenty-five percent of the black in specified locations within that sub-patch. In many instances, a typical barcode reader would not discern these smaller features of a single patch such as patch 30. Instead, the patch encoding the scramble code could be examined separately by a higher resolution capture device such as a scanner, near field digital camera, or a USB microscope.

Figure 8:
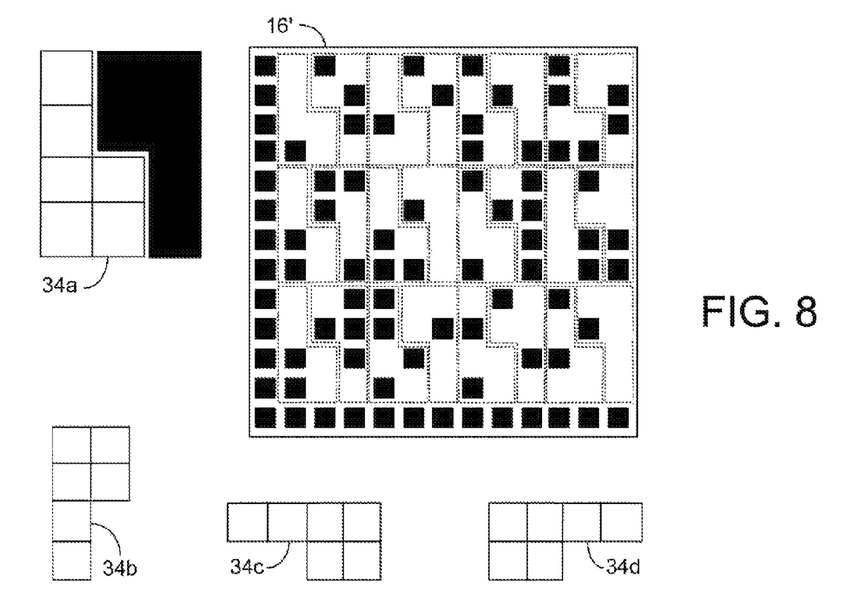
FIGS. 8 and 9 depict examples of region patterns according to various embodiments.
Figure 9:
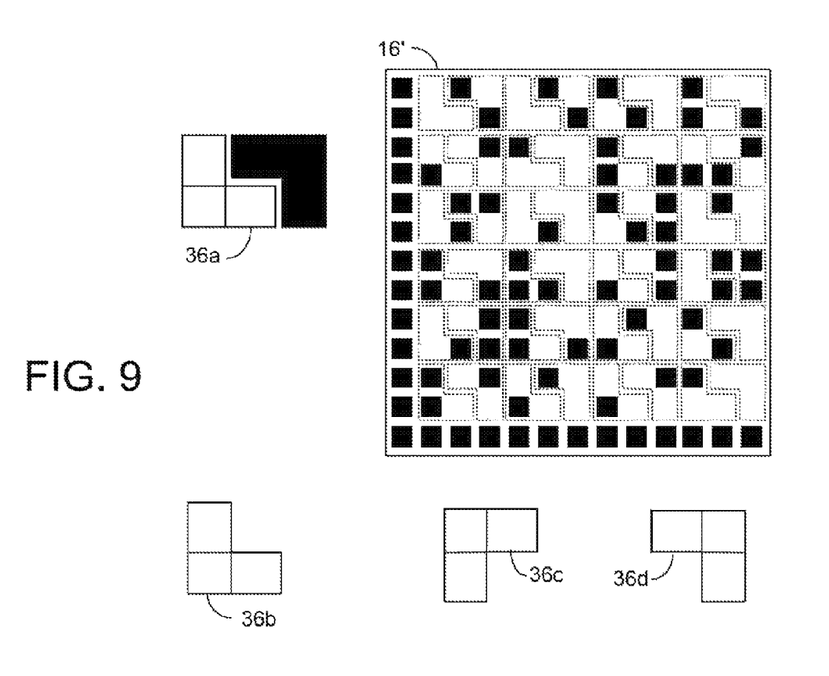

In the preceding examples, each region mapped to a set of payload patches had a square pattern mapped to a three by three grouping of payload patches. The region pattern or patterns can take many other forms. In particular any pattern or patterns that fit together to be mapped to the payload patches of a barcode will suffice. FIGS. 8 and 9 provide examples. Starting with FIG. 8, the region pattern is a four patch high "L" shape that can be oriented in a number of fashions 34a-34e. In FIG. 9, the region pattern is a two-patch high "L" shape that can also be oriented in a number of fashions 36a-36e.

In general, a region pattern defines one or more of a boundary shape, size, and orientation. In the examples of FIGS. 8 and 9, the region pattern would specify an "L" shape boundary, a size of either two-high or four-high, and a starting orientation of one of 34a-34d, 36a-36d as the case may be. In the examples of FIGS. 6 and 7, a barcode or other mechanism was used to encode the scramble pattern. The same mechanism may also be used to encode or otherwise identify the region pattern.

Decoding System

Figure 10:
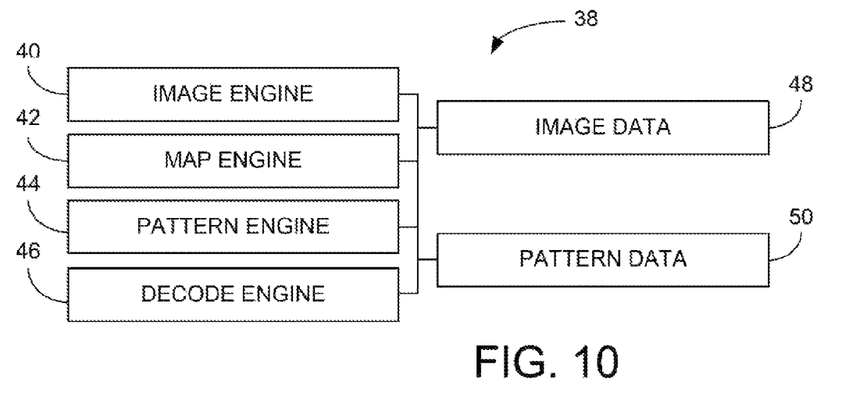
FIG. 10 depicts an exemplary decode system according to an embodiment.
Figure 11:
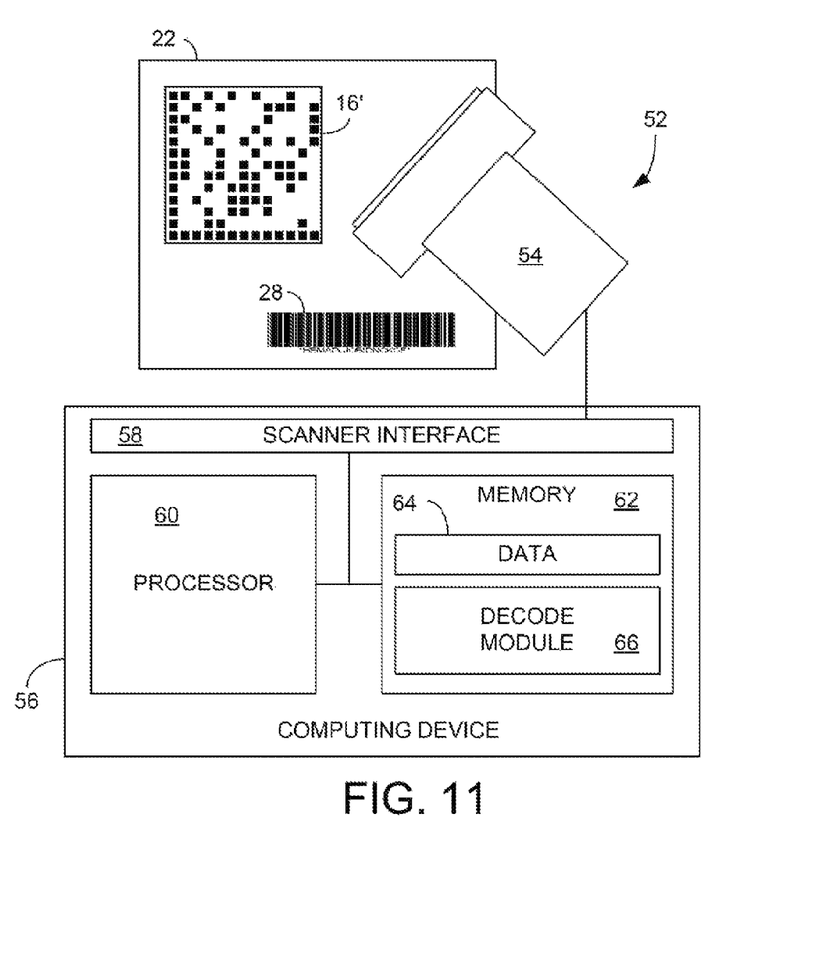
FIGS. 11 and 12 depict exemplary environments in which the decode system of FIG. 10 may be implemented.
Figure 12:
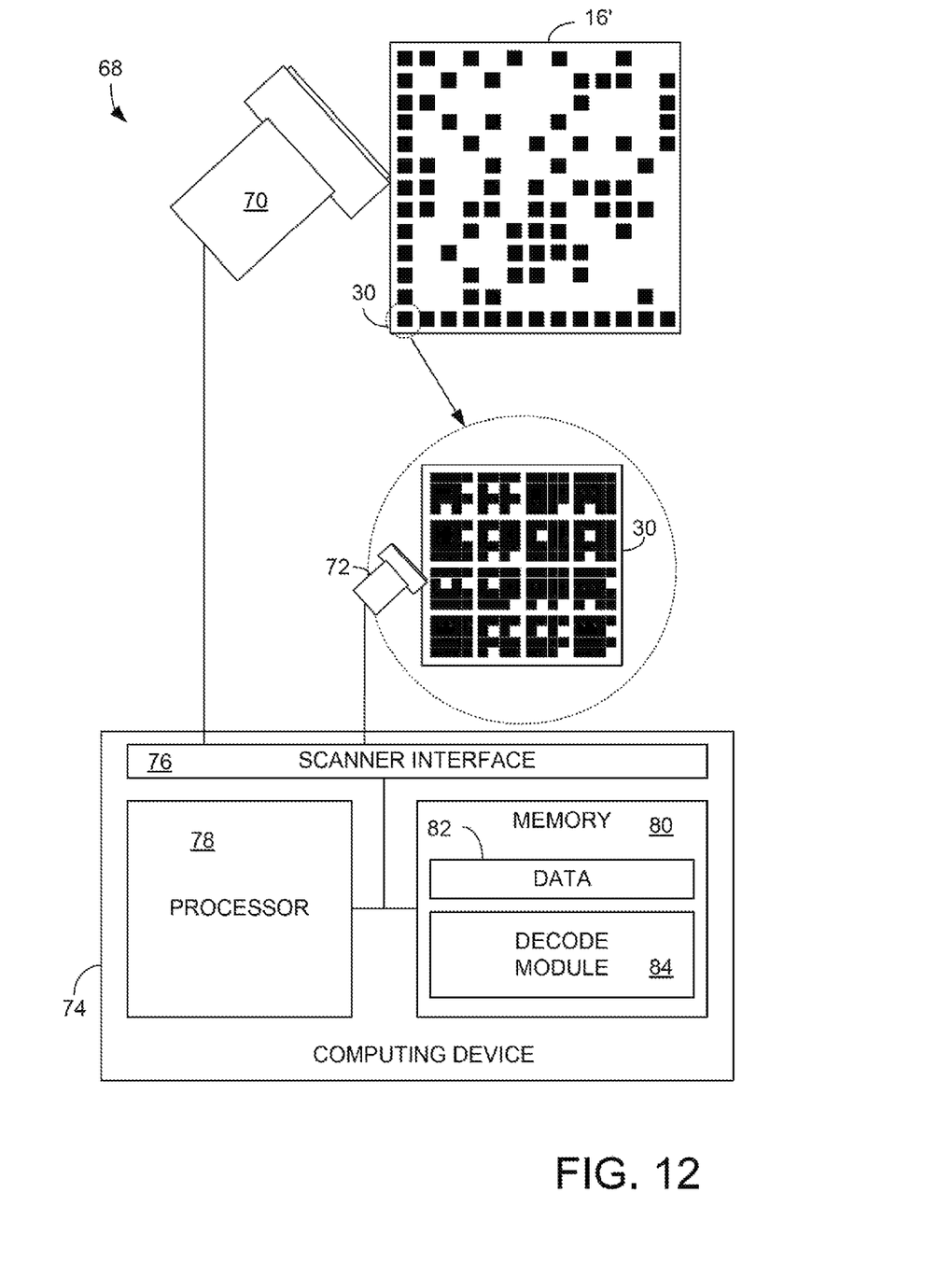

FIGS. 10-12 depict various physical and logical components that function as a system 38 for decoding a physical image having a plurality of payload patches. System 38 is shown to include image engine 40, map engine 42, pattern engine 44, decode engine 46, image data 48, and pattern data 50. Image engine 40 represents generally any combination of hardware and programming capable of generating a digital representation of a physical image. In particular, image engine 40 is responsible for receiving data from a barcode scanner and generating a digital representation of a physical barcode such as data matrix 16' of FIG. 5. Image engine 40 may then save that digital representation as image data 48. Such a digital representation may be a bitmap image or it may be a "bit matrix." Where, for example, the physical image is a black and white data matrix, each cell in the "bit matrix" would contain a bit—a one or a zero. Where the physical image is a color or grayscale data matrix, each cell in the bit matrix would represent a color or shade of gray. For example, the cell may contain data indicative of three color channel values for a color patch or a single grayscale channel value for a grayscale patch. Alternatively, the digital representation may be a bit string arranged in a defined order with each bit or group of bits representing a patch in the physical image.

Image engine 40 may also be responsible for generating a second digital representation of a second physical image that encodes or otherwise identifies one or both of a scramble pattern and a region pattern. The second physical image may, for example, be of a second barcode or it may be a portion of the first digital representation—such as a single patch of a data matrix barcode. Image engine 40 then saves the second digital representation as pattern data 50. Again, the second digital representation may be a bitmap image, bit matrix, or a bit string.

Map engine 42 represents generally any combination of hardware and programming capable of mapping a plurality of regions to the payload patches in a digital representation generated by image engine 40. In performing its task, map engine 42 may use a region pattern identified in pattern data 50. The region pattern may be a default pattern or a pattern identified by a digital represent of a physical image generated by image engine 40. Again, the region pattern can identify one or more of a boundary shape, size, and orientation.

Pattern engine 44 represents generally any combination of hardware and programming capable of reordering mapped regions of the digital representation according to a scramble pattern. In performing its tasks, pattern engine 44 may use a scramble pattern identified in pattern data 50. The scramble pattern may be a default pattern or a pattern identified by a digital represent of a physical image generated by image engine 40. The scramble pattern may identify an order in which the mapped regions were scrambled or, inversely, an order in which the mapped regions are to be re-ordered. Mapped regions may, for example, be sectors of a bitmap image, groupings of cells in a bit matrix, or portions of a bit stream. In performing its task, pattern engine 44 may, as needed, reorder the sectors of a digital image, reorder the cell groupings of a bit matrix, or reorder the sections of a bit stream.

Decode engine 46 represents generally any combination of hardware and programming capable of decoding information from the payload patches of the reordered plurality of mapped regions. In one example, the reordered mapped regions are a bit map image. In such a case, decode engine 46 examines the bitmap image and generates a corresponding bit matrix or bit stream. Decode engine 56 then decodes the bit matrix or stream to identify information encoded in the physical image. In another example, the reordered mapped regions are already in the form of a bit matrix or bit stream. Decode engine 56 then directly decodes the bit matrix or stream.

System 38 of FIG. 10 may be implemented in a number of environments such as environment 52 of FIG. 11. Environment 52 includes scanner 54 and computing device 56 which cooperate to decode information from physical barcode 16' formed on object 22. Scanner 54 may be integrated into computing device 56 or a separate component. Scanner 54 represents generally any device capable of being used to capture a digital representation of a physical image. Here scanner 54 is used to capture digital representations of barcode 16' and barcode 28. Computing device 56 represents generally any device that can analyze information captured by scanner 54 to decode information from barcode 16'. In one example, computing device 56 may be a portable device such as a cellular telephone or the like and scanner 54 may be a digital camera embedded in that portable device. In another example, scanner 54 may be a separate device that can communicate with computing device 56 via a wired or wireless link. Such communication may also be accomplished via a memory device such as a CD Rom or flash memory card.

In the example of FIG. 11, computing device 54 includes scanner interface 58, processor 60, and memory 62. Scanner interface 58 represents generally any combination of hardware and/or programming configured to allow computing device 56 to receive data from scanner 54. Scanner interface 58, for example, may be a wired or wireless communications port. Scanner interface 54 may instead be a CD Rom drive or a memory card reader. Processor 60 represents generally any device capable of utilizing scanner interface to obtain data from scanner 54. Processor 34 is also responsible for executing program instruction stored in memory 62. Memory 62 represents generally any memory configured to store program instructions that, when executed, cause processor 60 to analyze and decode information from barcode 16'.

Memory 62 is shown to include data 64 and decode module 66. Data 64 represents, generally, data utilized by decode module 66 in performing its tasks. Data 64 may, for example, include a one or more of a default scramble pattern and a default region pattern. Data 64 may also include digital representations of barcodes 16' and 28 as generated by decode module 66. Decode module 66 represents generally any programming for analyzing and decoding information from a digital representation of a physical image such as that of barcode 16.' In particular, decode module 66 is responsible for communicating with scanner 54 to generate a digital representations of barcode 16' and barcode 28. The digital representation of barcode 16 includes a plurality of payload patches. Depending on the form of the digital representation, those payload patches may be represented by patches of a bitmap, cells within a bit matrix, or segments of a bit stream.

When executed, decode module 66 identifies a scramble pattern and a region pattern by analyzing the digital representation of barcode 28. Alternatively, decode may identify a default region or scramble code stored in data 64. Decode module 66 maps a plurality of regions to the plurality of payload patches according to the region pattern and then reorders the mapped regions of payload patches according to the scramble pattern. Decode module 66 decodes information from the reordered plurality of mapped regions of payload patches.

Referring now to FIG. 12, system 38 of FIG. 10 may be implemented in environment 68. Environment 68 includes scanners 70 and 72 and computing device 74 which cooperate to decode information from physical barcode 16' and an individual patch 18 of barcode 16'. Scanners 70 and 72 may be integrated into computing device 74 or a separate component. Scanner 70 represents generally any device capable of being used to capture a digital representation of barcode 16', while scanner 72 is of a higher resolution and capable of being used to capture a digital representation of a single patch 30 of barcode 16'.

Computing device 74 represents generally any device that can analyze information captured by scanners 70 and 72 to decode information from barcode 16'. In the example of FIG. 12, computing device 74 includes scanner interface 76, processor 78, and memory 80. Scanner interface 76 represents generally any combination of hardware and/or programming configured to allow computing device 74 to receive data from scanners 70 and 72. Scanner interface 76, for example, may be a wired or wireless communications port. Scanner interface 76 may instead be a CD Rom drive or a memory card reader. Processor 78 represents generally any device capable of utilizing scanner interface 76 to obtain data from scanners 70 and 72. Processor 78 is also responsible for executing program instructions stored in memory 80. Memory 80 represents generally any memory configured to store Memory 62 represents generally any memory configured to store program instructions that, when executed, cause processor 78 to analyze and decode information from barcode 16'.

Memory 80 is shown to include data 82 and decode module 84. Data 82 represents, generally, data utilized by decode module 66 in performing its tasks. Data 82 may, for example, include a one or more of a default scramble pattern and a default region pattern. Data 82 may also include digital representations of barcode 16' and patch 18 as generated by decode module 84. Decode module 84 represents generally any programming for analyzing and decoding information from a digital representation of a physical image such as that of barcode 16.' In particular, decode module 84 is responsible for communicating with scanner 70 to generate a digital representations of barcode 16' and to communicate with scanner 72 to generate a digital representation of patch 18. The digital representation of barcode 16' includes a plurality of payload patches. Depending on the form of the digital representation, those payload patches may be represented by patches of a bitmap, cells within a bit matrix, or segments of a bit stream.

When executed, decode module 84 identifies one or both of a scramble pattern and a region pattern by analyzing the digital representation of patch 18. Decode module 84 then maps a plurality of regions to the plurality of payload patches according to the region pattern and then reorders the mapped regions of payload patches according to the scramble pattern. Decode module 84 can then decode information from the reordered plurality of mapped regions of payload patches.

Encoding System

Figure 13:
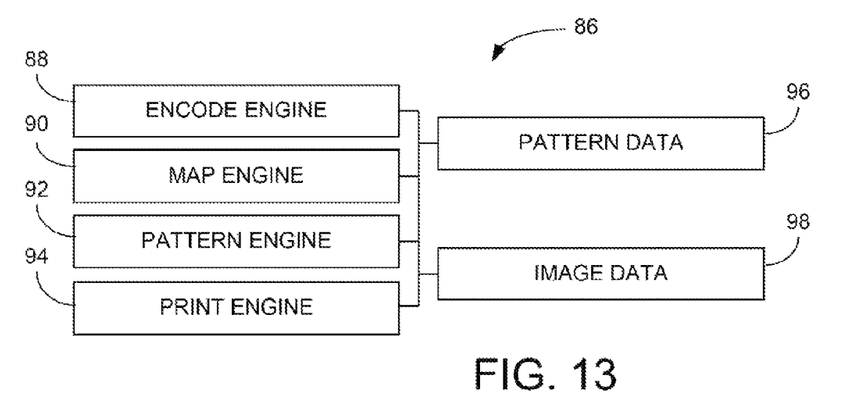
FIG. 13 depicts an exemplary decode system according to an embodiment.
Figure 14:
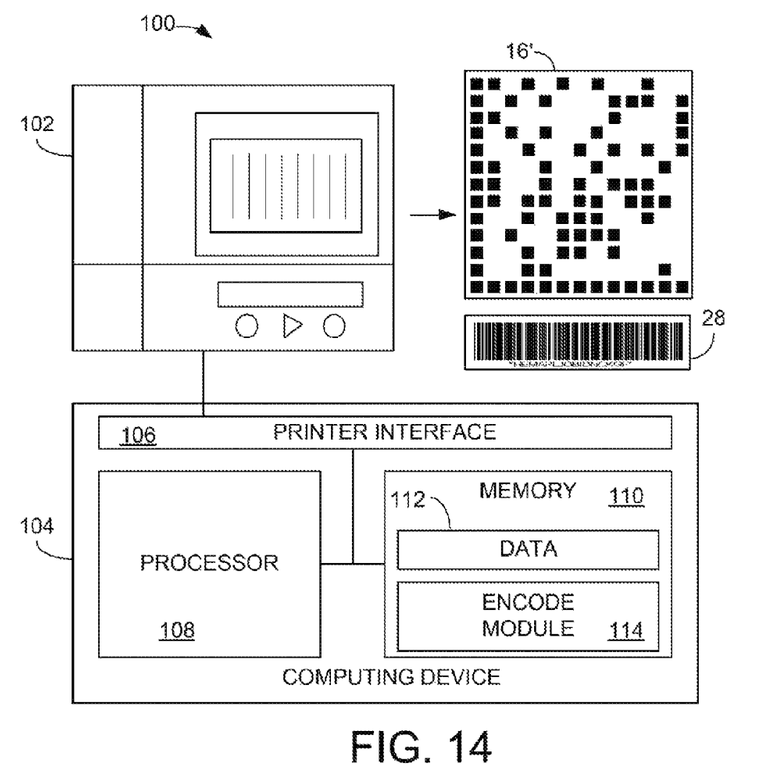
FIG. 14 depicts an exemplary environment in which the encode system of FIG. 13 may be implemented.

FIGS. 13-14 depict various physical and logical components that function as a system 86 for encoding printing a physical image encoding information in a plurality of payload patches. System 86 is shown to include encode engine 88, map engine 90, pattern engine 92, print engine 102, pattern data 96, and image data 98. Encode engine 88 represents generally any combination of hardware and programming capable of generating a digital representation of a barcode having a plurality of payload patches that encode information. Encode engine 88 may then save that digital representation in image data 98. Such a digital representation may be a bitmap image or bit matrix, or a bit stream. Where, for example, the physical image is to be printed as a black and white data matrix, each cell in a bit matrix would contain a bit—a one or a zero. Where the physical image to be printed is a color or grayscale data matrix, each cell in the bit matrix would contain data indicative of color channel values or a grayscale channel value. Alternatively, the digital representation may be a bit string arranged in a defined order with each bit or group of bits representing a patch in the physical image to be printed.

Encode engine 88 may also be responsible for generating a second digital representation of a second physical image to be printed that encodes or identifiers one or both of a scramble pattern and a region pattern. The second digital representation may, for example, be of a second barcode to be printed or it may be an alteration of a portion of the first digital representation—such as a single patch of a data matrix. Encode engine 88 then saves the second digital representation in image data 98. The region and scramble patterns may be default patterns or may otherwise be identified by pattern data 96. Again, the second digital representation may be a bitmap image, bit matrix, or a bit string.

Map engine 90 represents generally any combination of hardware and programming capable of mapping a plurality of regions to the payload patches in the digital representation generated by encode engine 88. In performing its task, map engine 90 may use a region pattern identified in pattern data 96. The region pattern can identify one or more of a boundary shape, size, and orientation.

Pattern engine 92 represents generally any combination of hardware and programming capable of reordering, within the digital representation, the mapped regions of payload patches according to a scramble pattern, thus obscuring encoded information. In performing its tasks, pattern engine 92 may use a scramble pattern identified in pattern data 50. The scramble pattern may identify an order in which the mapped regions are to be scrambled or, inversely, later descrambled. Mapped regions may be sectors of a bitmap image, groupings of cells in a bit matrix, or portions of a bit stream. In performing its task, pattern engine 92 may, as needed, reorder the sectors of a digital image, reorder the cell groupings of a bit matrix, or reorder the sections of a bit stream.

Print engine 94 represents generally any combination of hardware and programming capable of producing physical images. In particular, print engine 94 is responsible for producing a physical image of a barcode containing the reordered mapped regions of payload patches. Print engine 94 is also responsible for producing a physical image of a second barcode that encodes one or both of the scramble pattern and the region pattern.

System 89 of FIG. 13 may be implemented in a number of environments such as environment 100 of FIG. 14. Environment 100 includes printer 102 and computing device 104 which cooperate to produce physical images of barcode 16' and barcode 28. Printer 102 may be integrated into computing device 104 or a separate component. Printer 102 represents generally any device capable of printing physical images. Here printer 102 is used to print barcodes 16' and 28. Computing device 104 represents generally any device that generate digital representation of bar codes 16' and 28 that can be printed by printer 102.

In the example of FIG. 14, computing device 104 includes printer interface 106, processor 108, and memory 110. Printer interface 106 represents generally any combination of hardware and/or programming configured to allow computing device 104 to communicate printing instructions to printer 102. Printer interface 106, for example, may be a wired or wireless communications port, a CD Rom drive, or a memory card reader. Processor 108 represents generally any device capable of utilizing printer interface 106 to communicate data to printer 102. Processor 108 is also responsible for executing program instruction stored in memory 110. Memory 110 represents generally any memory configured to store program instructions that, when executed, cause processor 108 to generate and communicate printing instructions for printer 102 to print barcodes 16' and 28.

Memory 110 is shown to include data 112 and encode module 114. Data 112 represents generally data utilized by encode module 66 in performing its tasks. Data 112 may, for example, include a one or more of a default scramble pattern and a default region pattern. Data 112 may also include digital representations of barcodes 16' and 28 as generated by encode module 112. Encode module 114 represents generally any programming for generating digital representations of a physical image to be printed such as barcodes 16' and 28. The digital representation of barcode 16' includes a plurality of payload patches. Depending on the form of the digital representation, those payload patches may be represented by patches of a bitmap image, cells within a bit matrix, or segments of a bit stream.

When executed, encode module 114 generates a digital representation of a physical image that encodes one or both of a scramble pattern and a region pattern. Encode module 114 also generates a digital representation of a physical image of a barcode containing payload patches that encodes desired information. Encode module 114 maps a plurality of regions to the plurality of payload patches based on the region pattern and then reorders or scrambles the mapped regions of payload patches according to the scramble pattern. Encode module 114 communicates printing instructions for use by printer 102 in producing physical images 16' and 28.

Operation

Figure 15:
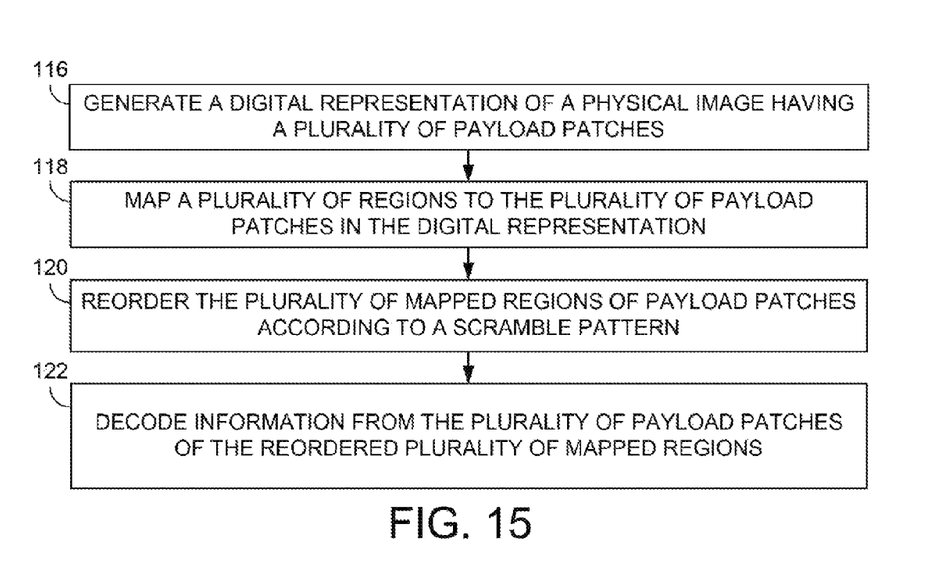
FIGS. 15-18 are flow diagrams depicting steps take to implement various embodiments.
Figure 16:
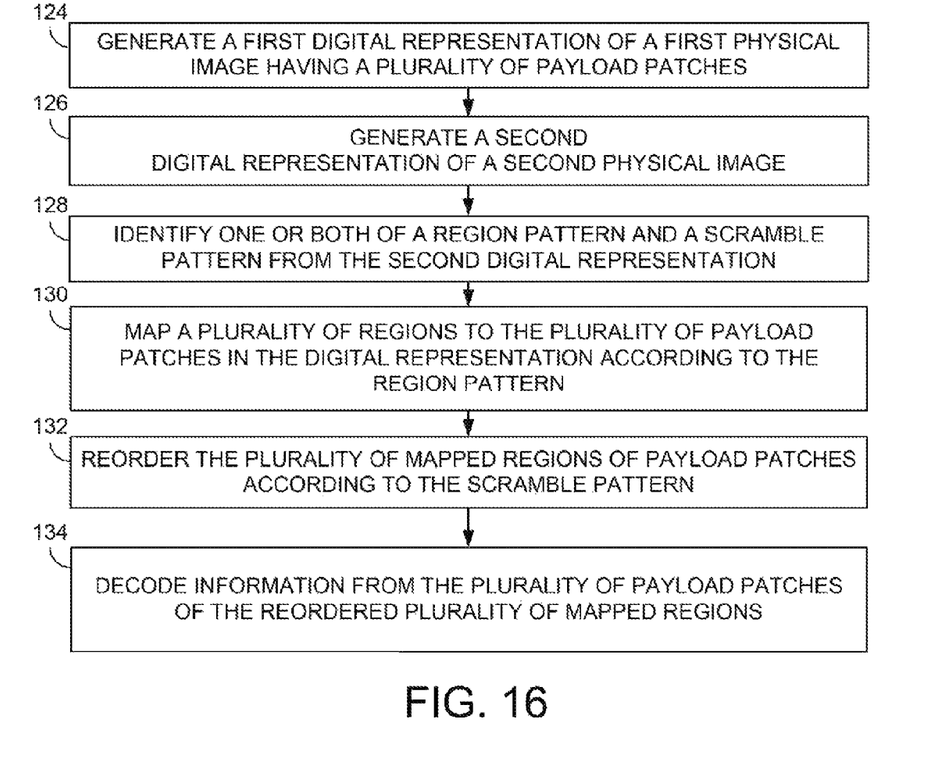

FIGS. 15-18 are exemplary flow diagrams of steps taken to implement various embodiments. In discussing FIGS. 15-18, reference is made to the diagrams of FIGS. 3-14 to provide contextual examples. Implementation, however, is not limited to those examples. FIGS. 15 and 16 are directed to steps taken to decode a physical image. Starting with FIG. 15, a digital representation of a physical image is generated (step 116). The physical image includes a plurality of payload patches. Step 116 may be accomplished, for example, by image engine 40 of FIG. 10 as implemented in FIG. 11 or 12. As previously noted, the digital representation may, for example, be a bit map image, a bit matrix, or a bit stream representation of the physical image.

A plurality of regions are mapped to the plurality of payload patches in the digital representation (step 118). Step 118 may be accomplished, for example, by map engine 42 of FIG. 10 as implemented in FIG. 11 or 12. FIGS. 3, 4, 8, and 9 depict examples in which regions are mapped to payload patches.

The plurality of mapped regions of payload patches are reordered according to a scramble pattern (step 120). Step 120 may be accomplished, for example, by pattern engine 44 of FIG. 10 as implemented in FIG. 11 or 12. As noted previously, the scramble pattern may identify an order in which the mapped regions were scrambled or, inversely, an order in which the mapped regions are to be descrambled. The scramble pattern may be known or provided. A scramble pattern, for example, may be discerned from a barcode or other physical image as depicted in the examples of FIGS. 6, 7, 11, 12, and 14. Information is then decoded from the reordered plurality of mapped regions of payload patches (step 122). Step 122 may be accomplished, for example, by decode engine 46 of FIG. 10 as implemented in FIG. 11 or 12.

Moving on to FIG. 16, a first digital representation of a first image is generated (step 124). The first physical image includes a plurality of payload patches. A second digital image of a second physical image is generated (step 126). Step 124 and 126 may be accomplished, for example, by image engine 40 of FIG. 10 as implemented in FIG. 11 or 12. As previously noted, the first and second digital representations may, for example, be bit map images, bit matrices, or bit stream representations of the physical images.

One or both of a region pattern and a scramble pattern are identified from the second digital representation (step 128). A plurality of regions are mapped to the plurality of payload patches in the digital representation according to the region pattern (step 130). Steps 128 and 130 may be accomplished, for example, by map engine 42 of FIG. 10 as implemented in FIG. 11 or 12. FIGS. 3, 4, 8, and 9 depict examples in which regions are mapped to payload patches.

The plurality of mapped regions of payload patches are reordered according to the scramble pattern (step 132). Step 132 may be accomplished, for example, by pattern engine 44 of FIG. 10 as implemented in FIG. 11 or 12. As noted previously, the scramble pattern may identify an order in which the mapped regions were scrambled or, inversely, an order in which the mapped regions are to be descrambled. Information is then decoded from the reordered plurality of mapped regions of payload patches (step 134). Step 134 may be accomplished, for example, by decode engine 46 of FIG. 10 as implemented in FIG. 11 or 12.

Figure 17:
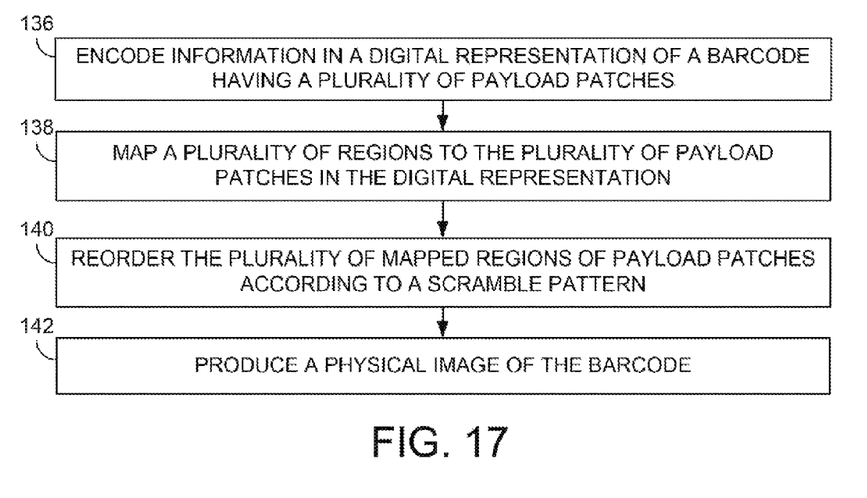
Figure 18:
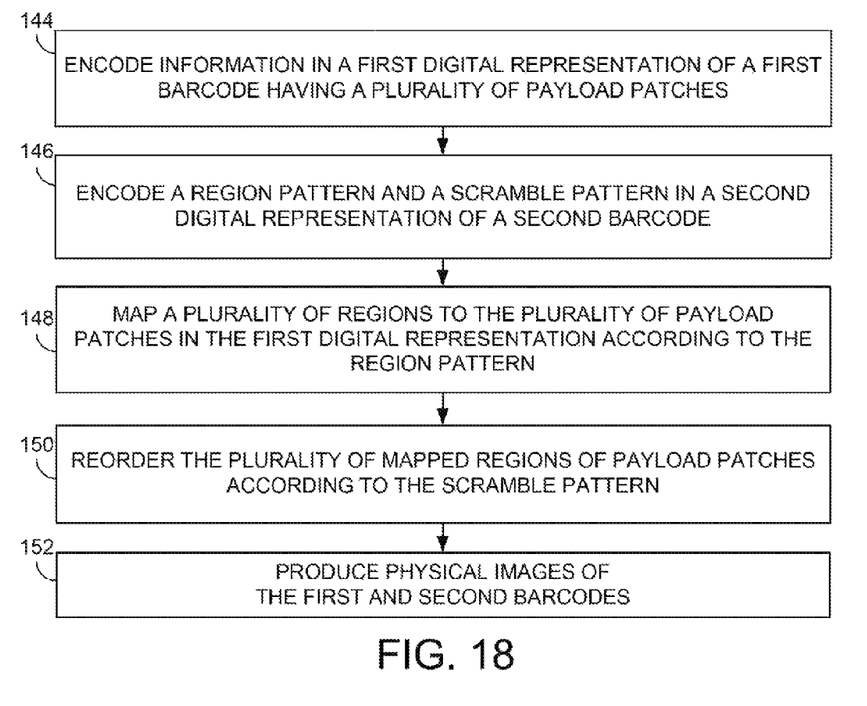

FIGS. 17 and 18 are directed to steps taken to encode a physical image. Starting with FIG. 17, information is encoded in a digital representation of a barcode having a plurality of payload patches (step 136). Step 136 may be accomplished, for example, by encode engine 88 of FIG. 13 as implemented in FIG. 14. As previously noted, the digital representation may, for example, be a bit map image, a bit matrix, or a bit stream representation of the barcode.

A plurality of regions are mapped to the plurality of payload patches in the digital representation (step 138). Step 118 may be accomplished, for example, by map engine 90 of FIG. 13 as implemented in FIG. 14. FIGS. 3, 4, 8, and 9 depict examples in which regions are mapped to payload patches.

The plurality of mapped regions of payload patches are reordered according to a scramble pattern (step 140). Step 140 may be accomplished, for example, by pattern engine 44 of FIG. 10 as implemented in FIG. 11 or 12. As noted previously, the scramble pattern may identify an order in which the mapped regions are to be scrambled or, inversely, an order in which the mapped regions are later to be descrambled. The scramble pattern may be known or provided. A physical image of the barcode is then produced (step 142). Step 142 may be accomplished, for example, by print engine 94 of FIG. 13 as implemented in FIG. 14.

Moving to FIG. 18, information is encoded in a first digital representation of a first barcode having a plurality of payload patches (step 144). One or both of a region pattern and a scramble pattern are encoded in a second digital representation of a second barcode (step 146). Steps 144 and 146 may be accomplished, for example, by encode engine 88 of FIG. 13 as implemented in FIG. 14. As previously noted, the first and second digital representations may, for example, be bit map images, bit matrices, or bit stream representations of the barcodes.

A plurality of regions are mapped to the plurality of payload patches in the first digital representation according to the region pattern (step 146). Step 146 may be accomplished, for example, by map engine 90 of FIG. 13 as implemented in FIG. 14. FIGS. 3, 4, 8, and 9 depict examples in which regions are mapped to payload patches.

The plurality of mapped regions of payload patches are reordered according to the scramble pattern (step 148). Step 148 may be accomplished, for example, by pattern engine 44 of FIG. 10 as implemented in FIG. 11 or 12. As noted previously, the scramble pattern may identify an order in which the mapped regions are to be scrambled or, inversely, an order in which the mapped regions are later to be descrambled. Physical images of the first and second barcodes are then produced (step 152). Step 152 may be accomplished, for example, by print engine 94 of FIG. 13 as implemented in FIG. 14.

CONCLUSION

The diagrams of FIGS. 1-9 show various examples of barcodes. However, implementation is not limited to particular types of barcodes shown. FIGS. 10-14 show the architecture, functionality, and operation of various embodiments. Various components illustrated in FIGS. 10-14 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 15-18 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for decoding a first physical image having a plurality of payload patches, comprising:
   generating a first digital representation from the physical image;
   generating a second digital representation of a second physical image; and
   utilizing a processor to:
   map a plurality of regions to the plurality of payload patches in the first digital representation;
   identify a scramble pattern from the second digital representation;
   reorder the plurality of mapped regions of payload patches according to the scramble pattern; and
   decode information from the payload patches of the reordered plurality of mapped regions.

2. The method of claim 1, wherein the second physical image being a portion of the first physical image.

3. The method of claim 1, wherein utilizing the processor to map comprises utilizing the processor to map the plurality of regions to the plurality of payload patches of the first digital representation according to a region pattern, wherein the region pattern at least indirectly defines, for each of the plurality of regions, one or more of a boundary shape, a boundary size, and a boundary orientation.

4. The method of claim 3, comprising:
utilizing the processor to identify the region pattern from the second digital representation.

5. A no transitory computer readable medium having instructions that when executed cause a processor to implement a method, the method comprising:
generating a first digital representation of a first physical image, the first digital image having a plurality of payload patches corresponding to payload patches of the first physical image;
generating a second digital representation of a second physical image;
mapping a plurality of regions to the plurality of payload patches in the first digital representation of the first physical image;
identifying a scramble pattern from the second digital representation of the second digital image;
reordering the plurality of mapped regions of the first digital representation according to the scramble pattern;
decoding information from the payload patches of the reordered plurality of mapped regions.

6. The computer readable medium of claim 5, wherein the second physical image being a portion of the first physical image.

7. The computer readable medium of claim 5, wherein mapping comprises mapping the plurality of regions to the plurality of payload patches of the first digital representation according to a region pattern, wherein the region pattern at least indirectly defines, for each of the plurality of regions, one or more of a boundary shape, a boundary size, and a boundary orientation.

8. The computer readable medium of claim 7, wherein the method comprises:
identifying the region pattern from the second digital representation.

9. A system for decoding information from a first physical image, comprising:
an image engine operable to generate a first digital representation of the first physical image and to generate a second digital representation of a second physical image, the first digital representation having a plurality of payload patches corresponding to payload patches of the first physical image;
a map engine operable to map a plurality of regions to the plurality of payload patches in the first digital representation;
a pattern engine operable to identify the scramble pattern from the second digital representation and reorder the plurality of mapped regions of the digital representation according to the scramble pattern;
a decode engine operable to decode information from the payload patches of the reordered plurality of mapped regions.

10. The system of claim 9, wherein the second physical image being a portion of the first physical image.

11. The system of claim 9, wherein the map engine is operable to map the plurality of regions to the plurality of payload patches of the first digital representation according to a region pattern, wherein the region pattern defines, for each of the plurality of regions, one or more of a boundary shape, a boundary size, and a boundary orientation.

12. The system of claim 11, wherein:
the pattern engine is operable to identify the region pattern from the second digital representation.

* * * * *